(12) United States Patent
Mutoh

(10) Patent No.: US 7,937,218 B2
(45) Date of Patent: May 3, 2011

(54) NAVIGATION APPARATUS

(75) Inventor: Shigehiro Mutoh, Anjo (JP)

(73) Assignee: DENSO CORPORATION, Kariya (JP)

( * ) Notice: Subject to any disclaimer, the term of this patent is extended or adjusted under 35 U.S.C. 154(b) by 916 days.

(21) Appl. No.: 11/882,130

(22) Filed: Jul. 31, 2007

(65) Prior Publication Data

US 2008/0040033 A1    Feb. 14, 2008

(30) Foreign Application Priority Data

Aug. 11, 2006  (JP) ................................. 2006-220239

(51) Int. Cl.
 *G01C 21/34* (2006.01)
(52) U.S. Cl. ........................................ 701/209; 701/211
(58) Field of Classification Search .......... 701/200–202, 701/207–211, 213–215; 340/988, 995.1, 340/95.1; 342/357.16
See application file for complete search history.

(56) References Cited

U.S. PATENT DOCUMENTS

| | | | |
|---|---|---|---|
| 5,928,308 A | | 7/1999 | Nanba et al. |
| 5,983,158 A | * | 11/1999 | Suzuki et al. ................. 701/209 |
| 6,006,161 A | | 12/1999 | Katou |
| 6,076,041 A | * | 6/2000 | Watanabe ..................... 701/211 |
| 6,144,318 A | | 11/2000 | Hayashi et al. |
| 6,202,026 B1 | * | 3/2001 | Nimura et al. ................. 701/211 |
| 6,351,706 B1 | * | 2/2002 | Morimoto et al. ............ 701/208 |
| 6,421,659 B1 | | 7/2002 | Nomura |
| 6,519,528 B2 | * | 2/2003 | Endo et al. .................... 701/211 |
| 6,751,609 B2 | | 6/2004 | Nomura |
| 6,842,694 B2 | * | 1/2005 | Irie ............................... 701/208 |

FOREIGN PATENT DOCUMENTS

| | | |
|---|---|---|
| JP | A-2002-267462 | 9/2002 |
| JP | A-2002-286487 | 10/2002 |
| JP | A-2004-317419 | 11/2004 |
| JP | A-2006-194902 | 7/2006 |

OTHER PUBLICATIONS

Second Office Action dated Apr. 22, 2010 in corresponding Chinese patent application No. 2007101408198 (and English translation).
Office Action dated Sep. 25, 2009 in corresponding Chinese patent application No. 2007101408198 (and English translation).
Office Action dated Sep. 13, 2010 in corresponding German application No. 10 2007 037 312.2 (English translation enclosed).
Office Action dated Jan. 11, 2011 in corresponding Japanese application No. 2006-220239 (English translation enclosed).

* cited by examiner

*Primary Examiner* — Yonel Beaulieu
(74) *Attorney, Agent, or Firm* — Posz Law Group, PLC

(57) ABSTRACT

A navigation apparatus provides a route guidance that selectively displays guidance information of a navigation route when the navigation route branches from a branch point. That is, for example, when the navigation route goes through two branch points in a series and the second branch point has plural branch roads respectively having guidance information, the navigation apparatus displays the guidance information of one of the branch roads relevant to the navigation route when a vehicle having the navigation apparatus approaches the first branch point.

7 Claims, 6 Drawing Sheets

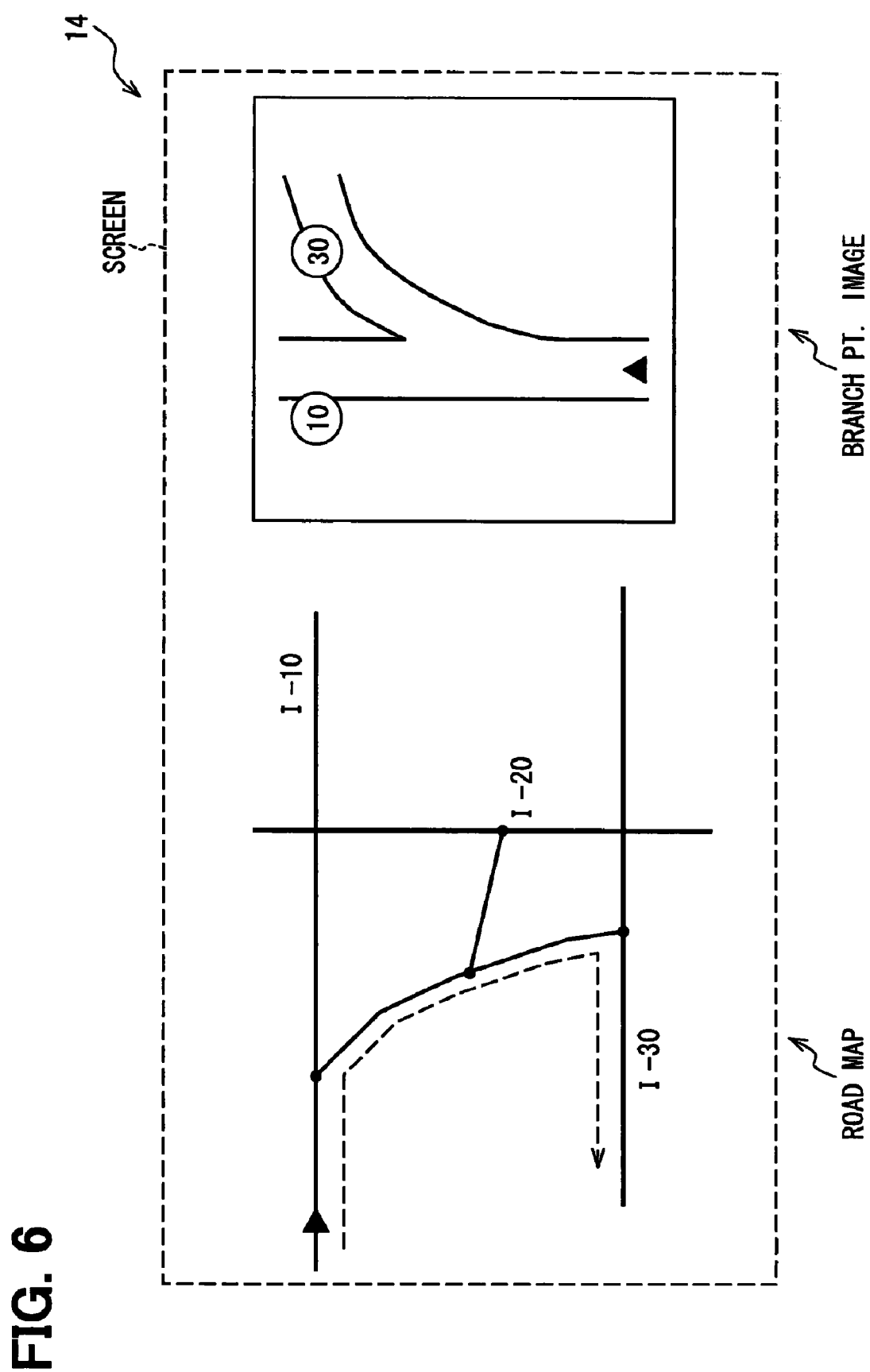

NAVIGATION APPARATUS

CROSS REFERENCE TO RELATED APPLICATION

This application is based on and claims the benefit of priority of Japanese Patent Application No. 2006-220239 filed on Aug. 11, 2006, the disclosure of which is incorporated herein by reference.

FIELD OF THE DISCLOSURE

The present disclosure generally relates to a navigation apparatus for use in a vehicle.

BACKGROUND INFORMATION

Conventionally, a navigation apparatus for use in a vehicle provides a route guidance and the like for a driver of the vehicle or the like based on road map data. For example, the navigation apparatus provides a route guidance from a start point of a travel to a destination when the start point and the destination are input.

The navigation apparatus uses as the road map data, for example, a road map as well as road information such as a road type (e.g., a national road, a prefectural road and the like), a road number, a road name (e.g., route 1, a causeway or the like) and the like. The road map data is stored in the navigation apparatus. Further, when the vehicle approaches a branch point in a route to the destination, the navigation apparatus displays on a screen of a display unit the road information of the road that comes after the branch point. In addition, the road information is stored in association with each of the branch point (i.e., a node) as disclosed in Japanese patent document JP-A-2002-286487.

However, the disclosure of the above patent document displays the road information of the road on which the vehicle travels after passing the approaching branch point, without displaying the road information of the road that lies ahead of the road to be traveled just after passing the approaching branch point.

On the other hand, by storing the road information of the road that is adjacent to the approaching branch point with a method that pre-reads the road information of every branching road from the approaching branch point, the road information of a navigation route can be displayed when the vehicle approaches the branch point.

However, when the navigation apparatus is configured in an above-described manner, the branch road that further branches ahead produces plural combination of roads, thereby leading to storage of the road information of all those road combinations and also leading to a display of all of the stored road information on the screen.

Therefore, when the navigation route consists of the branch road that further branches ahead to have plural roads in the traveling direction, the road information of all those roads is displayed on the screen, thereby making the size of the road information (e.g., character and/or illustration of road name/road number) smaller on the screen, or displaying the road information that is irrelevant to the navigation route.

In that case, the pre-read and stored road information may be selectively displayed on the screen in a manner that chooses and displays appropriate road information only (e.g., the road information of the road that consists of the navigation route). However, the method to select the appropriate road information has not been conceived to date.

SUMMARY OF THE DISCLOSURE

In view of the above and other problems, the present disclosure provides a navigation apparatus that securely and clearly displays road information of the roads that consist of a navigation route.

The navigation apparatus of the present disclosure includes a map information database that stores information of a map, a route setting unit that sets a guidance route to a destination, a display unit that displays an image, a position detector that detects a current position of a vehicle, and a control unit that controls a display of a guidance image for providing for an occupant of the vehicle the guidance route based on the current position of the vehicle detected by the position detector and information stored in the map information database.

The map information database stores information on at least one of a travelable road from a branch point and a connected road that lies ahead of the travelable road as road information relevant to each of the travelable roads from the branch point as well as road information associated to the branch point in the map.

When, in a case where the vehicle travels toward a branch point (i.e., an approaching branch point hereinafter) in the guidance route, the control unit displays on the display unit the road information of the connected road that lies ahead of a road that extends from the approaching branch point along the guidance route from among the road information in association with the approaching branch point stored in the map information database on a condition that the road information to be displayed comes in plural pieces, the control unit retrieves road information of a road along the guidance route as well as in association with one of subsequent branch points that lie ahead of the approaching branch point in the guidance route from among the road information stored in the map information database, and selectively displays on the display unit the road information (i.e., common road information hereinafter) that is found in common with the retrieved road information from among the road information that comes in the plural pieces.

That is, when the apparatus displays the road information of the road that extends from the current branch point ahead in the guidance route as a connected road that is connected to an immediate adjacent road of the current branch point in a case that there are plural connected roads, the navigation apparatus displays the road information of one of the plural connected roads, one of the plural roads which is in common with a second adjacent road that extends from the subsequent branch point subsequent to the current branch point in the guidance route, or in common with a second connected road that is connected to the second adjacent road of the subsequent branch point in the guidance route.

In this case, if a certain road is found to be the connected road that is connected to the road in the guidance route from the current branch point, and at the same time found to be the second adjacent road from the subsequent branch point in the guidance route or the second connected road that is connected to the second adjacent road in the guidance route, the certain road commonly found in the above two conditions is nothing else than the road that constitutes the guidance route.

Therefore, even when there is an irrelevant road that is connected to the connected road of the current branch point and is irrelevant to the guidance route, the road information of the guidance route is displayed securely in this manner. Further, the display of the road information is only limited to the relevant roads in terms of the guidance route, thereby preventing a reduction in size of the road information on the screen of the display unit for the ease of the recognition by the user.

BRIEF DESCRIPTION OF THE DRAWINGS

Other objects, features and advantages of the present invention will become more apparent from the following detailed description made with reference to the accompanying drawings, in which:

FIG. 6 shows an illustration of a screen image on a display unit.

DETAILED DESCRIPTION

Embodiments of the present disclosure are described with reference to the accompanying drawings.

Figure 1:
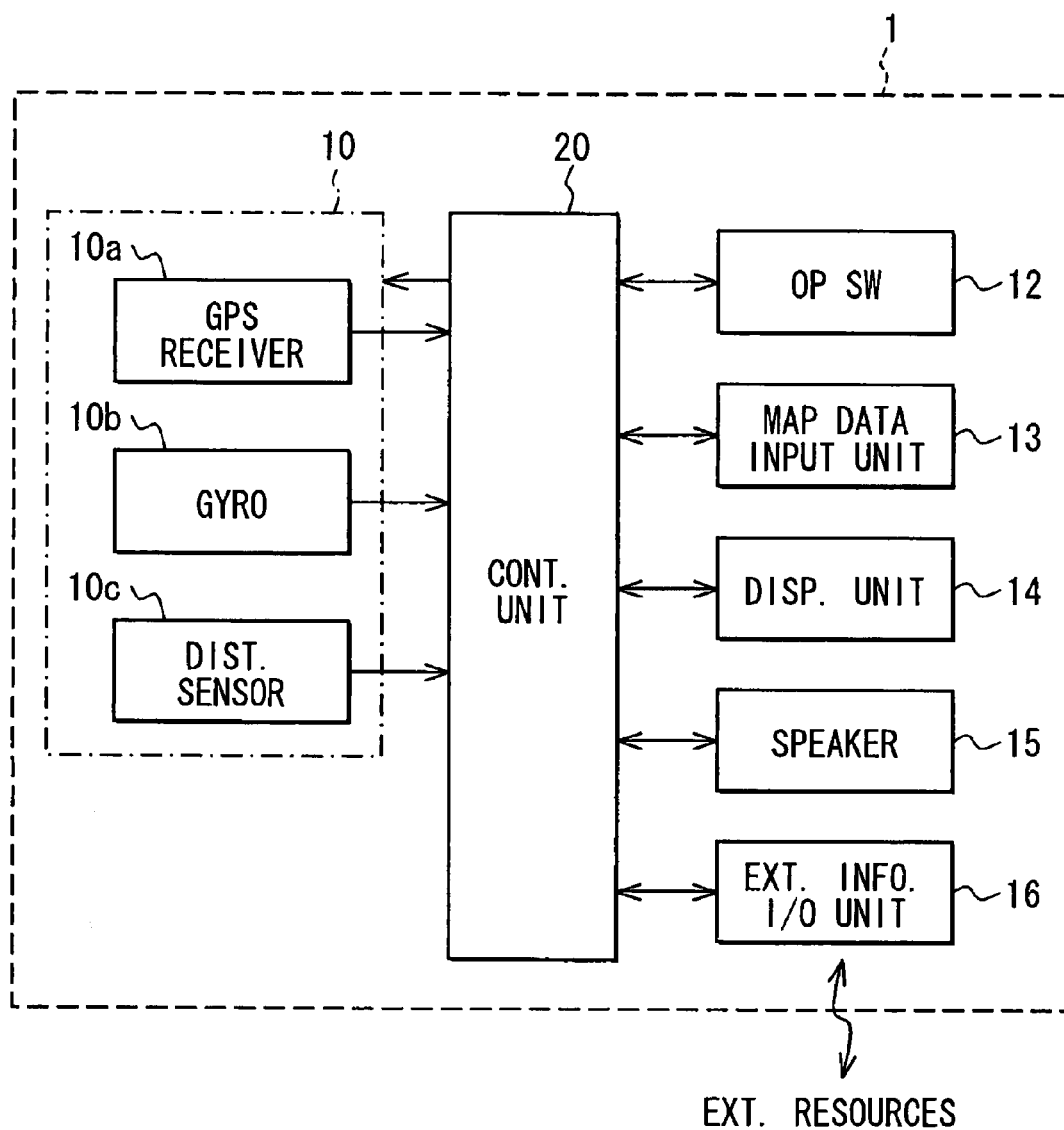
FIG. 1 shows a block diagram of a navigation apparatus in an embodiment of the present disclosure.

FIG. 1 shows a block diagram of a navigation apparatus in an embodiment of the present disclosure. The navigation apparatus includes a position detector 10 for detecting a current position of a vehicle, an operation switches 12 for inputting various instructions from a user (for example, a driver), a map data input unit 13 for inputting map data from an outside recording medium which records map data and various information, a display unit 14 for displaying various information such as a map, a television image and the like, a speaker 15 for outputting various guide sounds, an external information input/output (I/O) unit 16, and a control unit 20 for performing various operations according to an input from the above mentioned parts such as the position detector 10, the operation switches 12, the map data input unit 13, the external information I/O unit 16 and for controlling those parts.

The position detector 10 includes a GPS receiver 10a for receiving a radio wave from a Global positioning System (GPS) satellite through a GPS antenna to detect a position, a direction, a speed of the vehicle, a gyroscope 10b for detecting a degree of a rotational movement applied to the vehicle, and a distance sensor 10c for detecting a travel distance based on an acceleration in a front-rear direction of the vehicle. These components in the position detector 3 have detection errors of respectively different natures. Therefore, these components are configured to operate in a mutually compensating manner.

The operation switches 12 are provided as a touch panel on a screen of the display unit 14 in an integral manner, and as mechanical key switches disposed in a periphery of the screen of the display unit 14. In this case, the touch panel and the display unit 14 are integrally layered, and the touch panel may use any of the detection methods such as a pressure sensing method, an electric induction method, an electrostatic method and a combination of those methods or the like.

The map data input unit 13 is used to input map data stored in a memory medium (not shown in the figure). The map data includes link data, node data, map matching data for improve positional accuracy, mark data for representing facilities, image data for guidance image, sound data and the like. The link data consists of attributes such as a link ID for identifying a link (a road), coordinates of both ends of the link, a type, a road length, a road width and the like. The node data consists of attributes such as a node ID for identifying a node, node coordinates, node IDs of connecting nodes, node type (e.g., a type of node such as an intersection, a merge point or the like), an image ID for identifying a node image and the like. The map data is stored in a medium such as a CD-ROM, a DVD, a hard disk drive, various types of memory cards or the like.

The display unit 14 is a color display unit that may be constructed by using a liquid crystal display, a plasma display, a cathode ray tube (CRT), or the like. The screen of the display unit 14 displays a current vehicle position mark based on a detected current position by the position detector and map data from the map data input unit 13, a guidance route toward the destination, a facility name, a location name, a facility mark in a superposing manner. The display unit 14 is also capable of displaying a facility guide or the like.

The speaker 15 outputs guidance voice such as facility guidance from the map data input unit 13 and other guidance, announce of information from the external information I/O unit 16 and the like.

The external information input/output (I/O) unit 16 receives a FM broadcasting through a radio antenna (not shown in the figure), a beacon signal (a radio beacon and/or a light beacon) from a road side VICS system (Vehicle Information and Communication system operated in JAPAN). The information received by the I/O unit 16 is sent to the control unit 20 for processing. In addition, the I/O unit 16 is connected to a cellular phone to acquire information from an information center (not shown in the figure) or acquire information through an Internet connection from a server on the Internet.

The control unit 20 has a microcomputer as a main component, and the microcomputer consists of a CPU, a ROM, a RAM, an I/O and a bus for connecting those components. The control unit 20 performs, with an execution of a program in the ROM, a current position calculation operation by combining position coordinates and a travel direction based on various detection signals from the position detector 10, an image display operation for displaying the map of the current position and its vicinity from the map data input unit 13, an automatic route calculation operation from the current position to the destination based on the location data stored in the map data input unit 13 and inputs of the destination according to an operation of the operation switches 12, and other operations. The automatic route calculation is performed by employing Dijkstra method or the other well-know method of route calculation.

The route guidance performed by the navigation apparatus 1 is described with reference to the illustrations in FIGS. 2A to 2C. The route guidance includes, for example, displaying of a map and/or a guidance image.

Figure 2A:
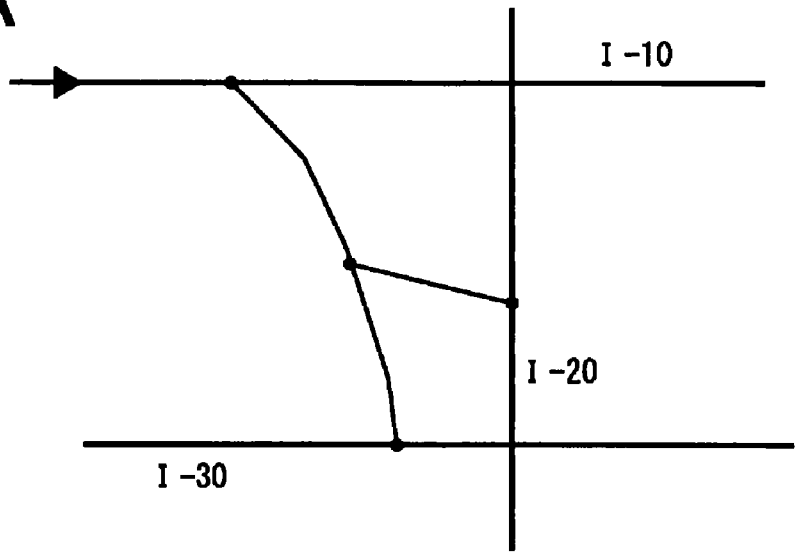
FIGS. 2A to 2C show illustrations and a diagram of a route guidance.

The illustration in FIG. 2A shows an example of a road map that is displayed on a screen of the display unit 6. The connectivity relationship of the roads are represented by assigning link IDs to the node data as described before.

I-10, I-20, I-30 in FIG. 2A respectively represent a road number. In addition, a triangle mark in the figure represents a current position of the vehicle that is equipped with the navigation apparatus 1.

The process of the route guidance is described with reference to FIGS. 2B and 2C. In this case, the road map in FIG. 2B is identical with the map in FIG. 2A.

Figure 2B:
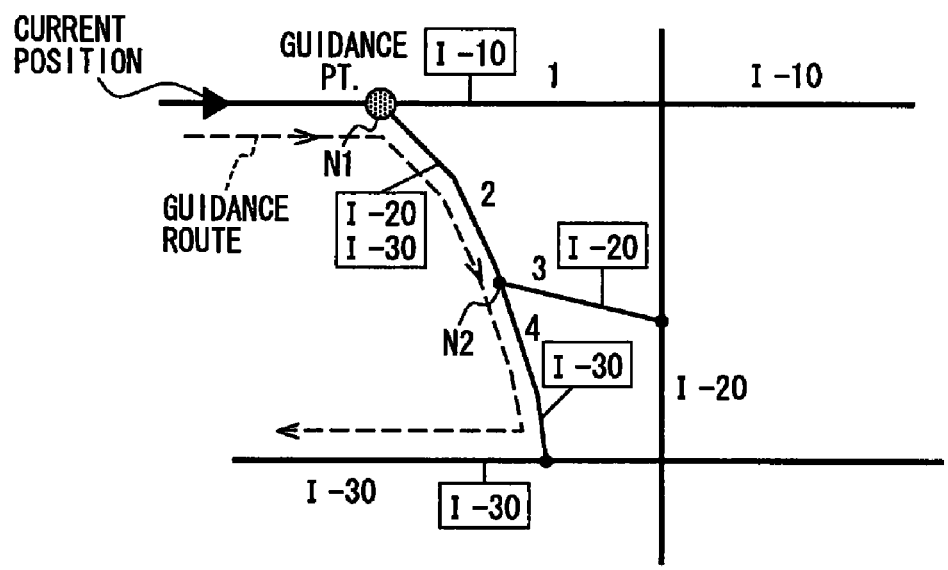

In FIG. 2B, the guidance route represented by a broken arrow line is, as described before, calculated by the control unit 20 automatically in advance based on a route calculation according to the destination inputted by the driver's operation of the operation switches 12. The data for representing the guidance route is stored in a RAM of the control unit 20 that is not shown in the figure.

Suppose the vehicle represented by the triangle mark is now approaching the branch point N1. In this case, a straight route from the branch point N1 toward the right in the figure is represented by the road with the link ID 1, and a right turn route from the branch point N1 toward the lower right in the figure is represented by the road with the link ID 2. Further, in the following description, the link on an approaching side of the branch point may be designated as an enter link, and the link on an exiting side from the branch point may be designated as an exit link depending on the context.

Figure 2C:

In this case, the branch point N1 has corresponding guide data for guiding the vehicle as shown in FIG. 2C. In addition, the illustration in FIG. 2C shows the guide data that is associated with the branch point N2.

The guide data is stored as the map data in a memory medium that is not shown in the figure in a corresponding manner for each of the branch points. As shown in FIG. 2C, the link ID 1 is associated with the information (i.e., the mark) that consists of a circle and a text of "10" for representing the road I-10. Further, the link ID 2 is associated with the information (i.e., the mark) of the circle and the text "20" for representing the road I-20, and the link ID 3 is associated with the information (i.e., the mark) of the circle and the text "30" for representing the road I-30. This is because, the exit link from the link ID 1 is connected to the road I-10, and the exit link from the link ID 2 is connected to the road I-20 through the link of the link ID 3, and the exit link from the link ID 2 is connected to the road I-30 through the link of the link ID 4.

Further, for the same reason, the link ID 3 and the information of the road I-20 are associated, and the link ID 4 and the information of the road I-30 are associated.

The information (i.e., the mark) of the roads that are associated with the link IDs may also be designated as shield information. The shield information is represented by the mark, that is, by an image, in the illustration in FIG. 2C. The shield information is further categorized by the shapes and the numbers. In this case, for example, the circle represents the road type of the national road, prefectural road or the like, and the number represents the road number. The other shapes such as a square, other triangular shape may represent other types of roads. Further, each of the marks has its origin associated thereto as shown in FIG. 2C. In this case, the shape data, that is, the data for representing the road types may be stored separately in association with the road number.

The control unit 20 reads the guide data (refer to FIG. 2C) associated to the branch point N1 from the map data input unit 13 when the vehicle approaches the branch point N1, and displays on the screen of the display unit 14 the shield information in association with the link ID in an associative manner with the road that is represented by the link ID (The detail of the display is described later). Further, in the present embodiment, the control unit 20 specifically displays the shield information of the road that constitutes the guidance route among the two pieces of the shield information that are associated with the link ID 2. That is, the shield information of the number 30 is displayed on the screen. The display process is described more practically in the following with reference to FIGS. 3 and 4.

Figure 3:
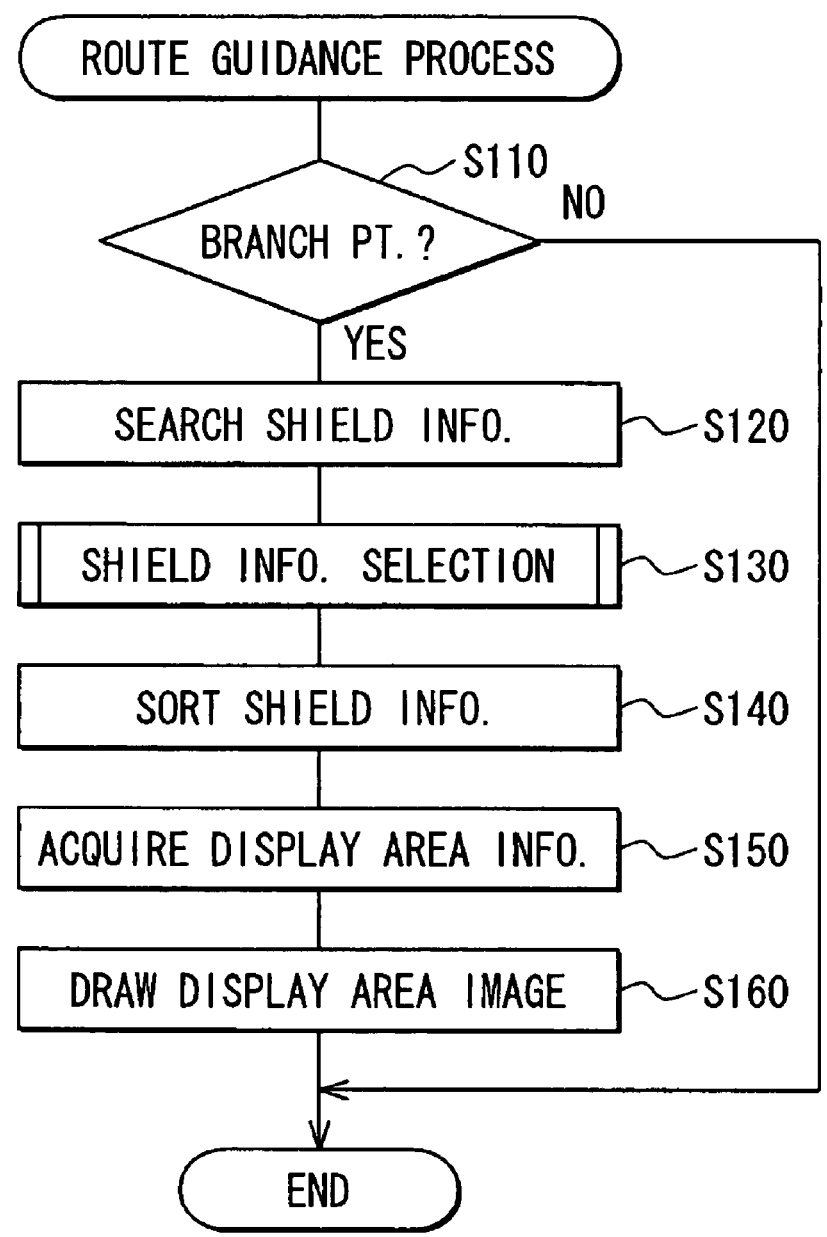
FIG. 3 shows a flowchart of a route guidance process in a control unit.
Figure 4:
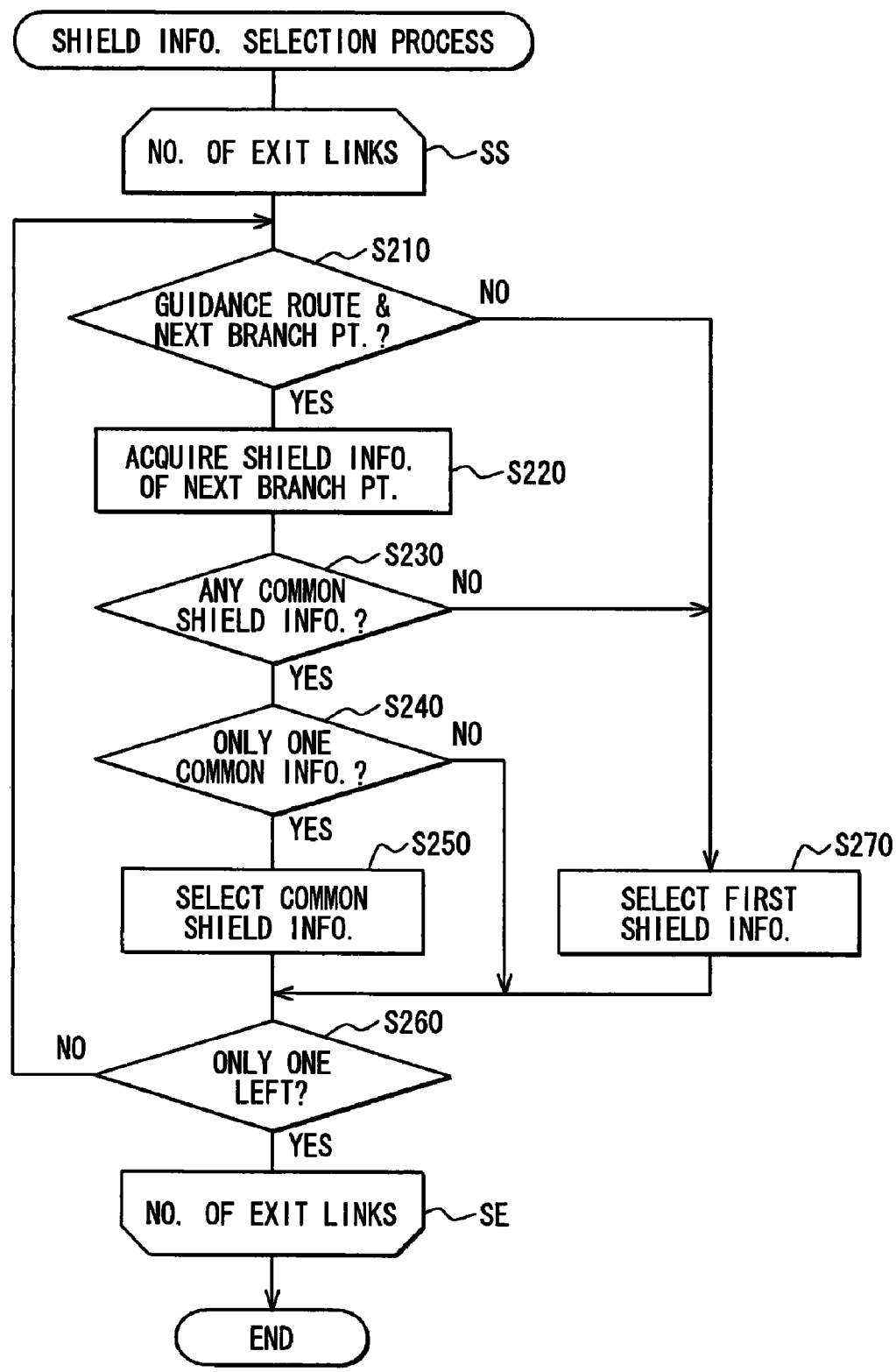
FIG. 4 shows a flowchart of a shield information selection process in the control unit.

FIG. 3 shows a flowchart of a route guidance process, and FIG. 4 shows a flowchart of a shield information selection process in step S130 of the flowchart in FIG. 3. The detail of each of processes in the flowcharts is described in the following. The detail of the example in FIG. 2B is also described later.

The route guidance process in FIG. 3 starts in step S110 that determines whether the vehicle is approaching the branch point (e.g., an intersection or the like) based on the current position of the vehicle and the map data. When the vehicle is determined to be approaching the branch point, the process proceeds to step S120, and the searches for the exit link from the approaching branch point (i.e., designated as a current branch point hereinafter). More practically, the guide data associated to the current branch point is read from the map data input unit 13, and the guide data is referred to search for the shield information being associated with the link ID of the exit link.

In addition, a branch point image data for representing each of the branch points is stored in the memory medium in association with the branch point. The data of the branch point image is retrieved from the map data input unit 13 when the process in step S110 is determined to be affirmative.

Then, in step S130, the shield information selection process is performed for each of the exit link of the current branch point. The shield information selection process selects one piece of the shield information to be displayed on the display unit 14 from among the shield information searched in step S120. In this case, the content of the shield information selection process is described with reference to the flowchart in FIG. 4.

The process in FIG. 4 starts in step SS that acquires the shield information in association with the link ID of the exit link from among the shield information being searched for in step S120 for the exit link that does not have selected shield information.

When the acquired shield information is only one piece, that is, when the shield information associated with the link ID of the exit link is only one piece, the shield information is selected and process exit from SS-SE loop (to return to step SS). Then, the shield information searched in step S120 is assigned to other exit links that does not yet have the selected shield information in the same manner.

On the other hand, when plural pieces of the shield information is acquired in step SS, that is, when the exit link is associated with the plural pieces of the shield information, the process proceeds to step S210.

The process in step S210 determines whether a subject exit link is the exit link that constitutes the guidance route and whether the subsequent branch point relative to the current branch point is existing. The subsequent branch point is also designated as the first branch point hereinafter. When the subject exit link is the exit link of the guidance route and the first branch point is existing, the process proceeds to step S220.

In step S220, the process acquires the shield information that is associated with the link ID of the exit link in the guidance route from among the exit links of the first branch point by referring to the guide data in association with the first branch point.

Then, the process proceeds to step S230 to determine whether there is a common piece of the shield information between the acquired shield information of the current branch point in step SS and the acquired shield information of the first branch point in step S220. When there is a common piece of the shield information, the process proceeds to step S240.

In step S240, the process determines whether the common shield information is only one piece. When only one piece of the shield information is common, the process proceeds to step S250.

In step S250, the process selects the shield information that is a subject of the determination in step S240 (an affirmative determination), and proceeds to step S260.

In step S260 subsequent to step S250, the process determines that the shield information is determined as one piece of information to proceed to step SE. Then, the process in the series of steps between step SS and step SE is performed for the other exit links that do not have the selected shield information. On the other hand, the process proceed from step S260 to step SE to conclude itself when all the exit links has the selected shield information.

Further, when the subject exit link is the exit link of the guidance route with no first branch point associated thereto, or when the subject exit link is not the exit link of the guidance route, the process proceeds from step S210 to step S270.

Furthermore, when the process in step S230 determines that there is no common shield information between the acquired shield information of the current branch point in step SS and the acquired shield information of the first branch point in step S220, the process proceed to step S270.

In step S270, the process select a top piece of the shield information among the plural pieces of the shield information. In this case, the top piece means that the data is stored in an upper most data storage layer. Then, the process proceeds to step S260.

In step S270 subsequent to step S260, the process determines that the shield information is determined to be one piece to proceed to step SE.

On the other hand, when the shield information of the current branch point acquired in step SS and the shield information of the first branch point acquired in step S220 have plural common pieces, that is, when the process determines that there are plural pieces of the common shield information, the process proceeds to step S260.

In step S260 subsequent to step S240, the process determines that the shield information has not determined to be only one piece to return to step S210.

In step S210 subsequent to step S210, the process determines whether the subject exit link (i.e., the link that is determined to be the exit link of the guidance route previously in step S210) is the exit link that constitutes the guidance route and whether there is the next branch point relative to the first branch point (designated as the second branch point hereinafter) on the guidance route.

When the process determines that there is no second branch point in the determination in step S210 in a current cycle, the process proceeds to step S270 because the subject exit link is determined to constitute the guidance route previously in step S210.

On the other hand, when the process determines that there is the second branch point in step S210, the process proceeds to step S220. Then, the above-mentioned process (steps between S220 and S270, or step SE) is performed for the second branch point.

Then, in step S130 in FIG. 3, the shield information is selected for each of the exit links, and the process proceeds to step S140. Then, a predetermined order of precedence is assigned to connecting roads to the current branch point. In other words, the connecting roads of the current branch point are rearranged according to the predetermined order. More practically, the order of precedence is assigned to the connecting roads in a clockwise manner that circles around a center point of the branch point with a predetermined start point based on, for example, the current position of the vehicle when the connecting roads are searched for.

In this case, the process assigns the order to each of the connecting roads based on the branch point image previously mentioned in the above description. That is, by recognizing the direction and the relative position of the roads in the branch point image, the process determines the order of arrangement before assigning the order of precedence.

More accurately, the link ID associated with the branch point as well as the characteristic information of the link that is stored with the link ID are acquired for the calculation of the existence of the roads and/or the extending direction of the links. In this manner, the order is assigned to the roads in a certain (e.g., clockwise) manner.

In this case, the order of the roads may be in a counterclockwise direction as long as the rule of the order assignment is identical with the rule that is used for a shield information display area.

Then, the process proceeds to step S150 to acquire information of an area for displaying the shield information. The shield information display area is an area that is set in the branch point image of the current branch point. In this case, the information of the shield information display area is stored as the branch point image data in the memory medium (not shown in the figure). In addition, the shield information display area appears on plural section in the branch point image for each of the roads in the branch point image. Further, the display area has an order of precedence in a clockwise direction according to the appearance in the branch point image. The clockwise direction is defined around the center point of the branch point. The order of precedence may be determined in a counterclockwise manner.

Then, the process proceeds to step S160 to display the branch point image of the current branch point on the display unit 14 with the shield information superposed thereon. In this case, the order of the exit links and the order of the shield information display area are associated with each other. More practically, the shield information of the exit link having the first precedence is displayed in the shield information display area having the first precedence. In the same manner, the shield information of the second exit link is displayed in the second shield information display area. In this case, the shield information outputted as an image displayed in the information display area may also be outputted as a voice guidance from the speaker 15.

In this manner, the process concludes itself when the shield information is displayed on the branch point image in a superposing manner in step S160.

As described above, each of the exit links of the current branch point now has the selected shield information that is associated with the link ID of the respective exit links. More specifically, when one link ID is associated with plural pieces of shield information, only one piece of shield information is selected by the process in steps S220 to S250 if the link ID of the exit link comes from the exit link that constitutes the guidance route. That is, among the exit links of the first branch point (the branch point that is subsequent to the current branch point), the shield information of the link ID of the exit link that constitutes the guidance route is acquired for selecting a common piece of shield information from among plural pieces of shield information that are acquired for the current branch point. In this manner, the shield information of the road that constitutes the guidance route is selected. This is because a set of the roads identified as the connecting roads to the exit link from the current branch point in the guidance route and another set of the roads identified as the connecting roads to the exit link from the first branch point in the guidance route have nothing else than a common element of the road that constitutes the guidance route.

The example shown in FIG. 2B is further described with reference to FIGS. 5A, 5B, 5C and 6.

When the vehicle (the triangle mark) is determined to be approaching the branch point N1 in the guidance route by the control unit 20 (step S110: YES), the control unit 20 searches for the shield information in association with the exit link from the branch point N1 (the link of link ID 1 and the link of link ID 2) by referring to the guide data that is associated with the branch point N1 as shown in FIG. 2C.

In this case, according to the guide data in FIG. 2C, the shield information in association with the link ID 1 is only one piece (i.e., information represented by the number "10"). Therefore, the shield information is selected as the shield information of the link ID 1 (refer to step SS in FIG. 4).

On the other hand, the shield information in association with the link ID 2 is two pieces (i.e., information represented by the number "20" and "30"). Further, because the exit link from the link ID 2 constitutes the guidance route and there is the branch point N2 that is subsequent to the branch point N1 (S210: YES), the guide data (in FIG. 2C) in association with the branch point N2 is referred to. Then, among the exit links from the branch point N2, the shield information in association with the exit link (link ID 4) that constitutes the guidance route is acquired (step S220). Then, from among the shield information ("20" and "30") of the branch point N1, the common piece of shield information in common with the shield information acquired for the branch point N2 is selected as the shield information of the exit link of the link ID 2 (S230: YES, S240: YES, S250, S260: YES).

Then, the rearrangement of the exit links (assigning an order) performed in step S140 is described with reference to FIGS. 5A and 5B.

Figure 5A:
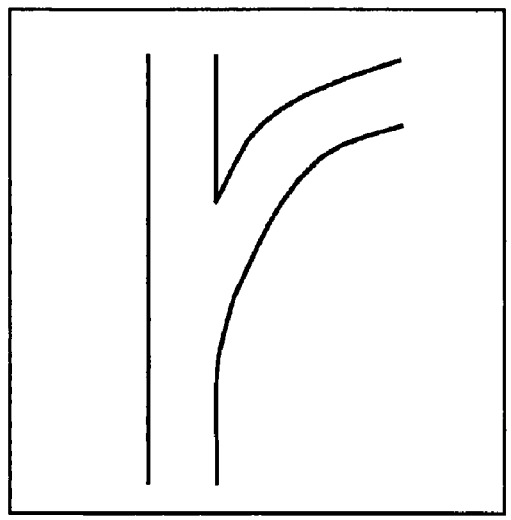
FIGS. 5A to 5C show illustrations of a branch point image.
Figure 5B:
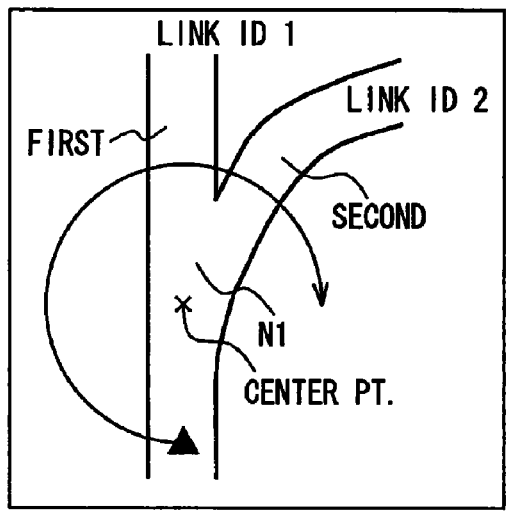

First, the illustration in FIG. 5A shows the branch point image of the branch point N1 that is in association with the branch point N1.

Then, in the branch point image, the exit links are searched for with a start point of, for example, the current vehicle position (or a position in the rear of the vehicle) and a center point of the branch point N1 (i.e., the coordinate point of the branch point N1) and are assigned with an order that accords with the order of appearance in the search in the clockwise direction around the center point. In this case, the first order is assigned to the exit link of link ID 1, and the second order is assigned to the exit link of link ID 2.

Then, the information of the shield information display area that is used for the shield information that is selected for each of the exit links in step S130 is acquired (S150).

In this case, the shield information display area is described with reference to FIG. 5C. The shield information display area in the branch point image is, for example, predetermined by a creator of the map data. Therefore, the data of the shield information display area is stored as a part of the branch point image data to be stored in the memory medium.

Figure 5C:
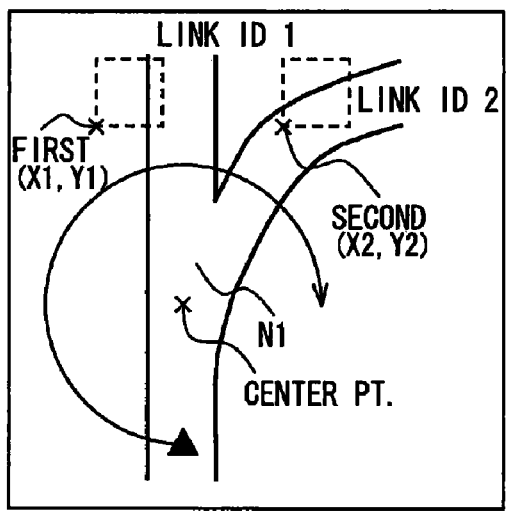

As shown in FIG. 5C, the shield information display area is represented by the coordinate in the branch point image. In this example, the coordinates are represented in a manner such as (X1, Y1), (X2, Y2) and the like. The origin of the branch point image is set at the lower left corner of the square image.

Further, each set of the coordinates (i.e., the shield information display area) has an assigned order. As shown in FIG. 5C, the assignment of the order is in the clockwise direction around the center point of the branch point N1 (i.e., the coordinate of the branch point (node) N1) with the start point of the current vehicle position (or the point in the rear of the vehicle). In this case, the first order is assigned to the coordinate (X1, Y1), and the second order is assigned to the coordinate (X2, Y2). Further, the coordinate data is stored in a storage area according to the order that is assigned to the coordinate.

That is, the coordinate (X1, Y1) is set as the shield information display area of the exit link of the link ID 1, the coordinate (X2, Y2) is set as the shield information display area of the exit link of the link ID 2, and the coordinate data of those display areas is stored in the predetermined storage area in an order that starts with the coordinate (X1, Y1) with the subsequent coordinate (X2, Y2).

When the coordinate data (i.e., the shield information display area) stored in the above-described manner is acquired, the acquired shield information display areas and the exit links are display in an associative manner (S160).

That is, the exit link in the first order (link ID 1) and the shield information display area in the first order (represented by the coordinate (X1, Y1)) are associated with each other, and the exit link in the second order (link ID 2) and the shield information display area in the second order (represented by the coordinate (X2, Y2)) are associated with each other.

Then, the branch point image is displayed on the screen of the display unit 14 as shown in FIG. 5A, and the shield information ("10") that is selected (in step S130) for the exit link (link ID 1) is superposed on the shield information display area (at the coordinate (X1, Y1)) that is associated with the exit link (link ID 1). At the same time, the shield information ("30") that is selected (in step S130) for the exit link (link ID 2) is superposed on the shield information display area (at the coordinate (X2, Y2)) that is associated with the exit link (link ID 2). In this case, the origin of the shield information display area and the origin of the branch point image are matched for displaying the image.

As a result, the route guidance image is displayed on the screen of the display unit 14 as shown in FIG. 6.

In FIG. 6, the road map is displayed on the left side of the screen, and the branch point image is displayed on the right side of the screen. The road map is basically displayed continuously while the navigation apparatus 1 is performing the route guidance. On the other hand, the branch point image is displayed by the process in FIGS. 3 and 4 only when the vehicle approaches the branch point.

As shown in FIG. 6, the branch point image of the approaching branch point is displayed only with the road information of the road I-30 that constitutes the guidance route even when there are two roads that are connected to the road on the right turn direction of the guidance route. In other words, the road information of the road I-20 that is not relevant in terms of the guidance route is not displayed.

In this manner, the branch point image displays the road information of the road that constitutes the guidance route for securely guiding the vehicle toward the direction of the guidance route, thereby enabling a route guidance in a secured and desirable manner. Further, the road information irrelevant to the guidance route is omitted from the screen, thereby enabling an easy-to-understand route guidance by the road information displayed in an appropriate size on the screen in an easily recognizable manner for the driver of the vehicle.

Further, the road information of the road I-10 that extends in a different direction from the guidance route, that is, the road information of the road connected to the one in the straight course is displayed as shown in FIG. 6.

In this manner, the intention of the driver who demands the road information of the road that is in a different direction from the guidance route is accommodated.

Furthermore, by selectively superposing the shield information on the branch point image, plural guidance routes can be represented in an economical manner in terms of the amount of data for image display, thereby enabling a reduction of the amount of data stored in the memory medium.

Although the present invention has been fully described in connection with the preferred embodiment thereof with reference to the accompanying drawings, it is to be noted that various changes and modifications will become apparent to those skilled in the art.

For example, though the shield information of the road type and the road number is displayed on the branch point image in the present embodiment, the road name may also be displayed. Further, the number of the lanes in the road and the road width may also be displayed.

Further, though the shield information of the next branch point relative to the current branch point is acquired first in steps S210 and S220 in FIG. 4, the shield information of the second branch point relative to the current branch point or the shield information of the third branch point relative to the current branch point may be acquired first. When the shield information of the branch point is acquired, how far should the read-ahead of the number of the branch points be extended in terms of the acquisition of the shield information may be arbitrarily determined either by the designer of the apparatus, the user of the apparatus or by the process in the control unit 20.

Such changes and modifications are to be understood as being within the scope of the present invention as defined by the appended claims.

What is claimed is:

1. A navigation apparatus comprising:
   a map information database that stores information of a map;
   a route setting unit that sets a guidance route to a destination;
   a display unit that displays an image;
   a position detector that detects a current position of a vehicle; and
   a control unit that controls a display of a guidance image for providing for an occupant of the vehicle the guidance route based on the current position of the vehicle detected by the position detector and information stored in the map information database,
   wherein the map information database stores information on at least one of a travelable road from a branch point and a connected road that lies beyond the travelable road as road information relevant to each of travelable roads from the branch point as well as road information associated to the branch point in the map, and
   when, in a case where the vehicle travels toward an approaching branch point in the guidance route,
      the control unit displays on the display unit, of the road information in association with the approaching branch point stored in the map information database, the road information of only the connected road that lies beyond a road that extends from the approaching branch point along the guidance route, on a condition that the road information has a plurality of information pieces for different roads,
      the control unit retrieves road information of a road along the guidance route as well as road information in association with at least one of subsequent branch points that lie beyond the approaching branch point in the guidance route from among the road information stored in the map information database, and
      the control unit selectively displays on the display unit, as common road information, of the retrieved road information in association with the at least one of the subsequent branch points, only the road information that is found in common with the retrieved road information of the road along the guidance route.

2. The navigation apparatus as in claim 1,
   wherein one of the subsequent branch points comes as a next branch point subsequent to the first branch point in the guidance route.

3. The navigation apparatus as in claim 1,
   wherein, when the vehicle approaches the approaching branch point, the control unit displays a branch point image on the display unit as well as displaying the common road information on the branch point image, and
   the control unit further displays on the branch point image each piece of the road information in a manner that designates a correspondence of the road information with a specific road in an area that is recognizable by a user of the apparatus in addition to displaying on the branch point image the road information relevant to a road that is not included in the guidance route from among the road information in association with the approaching branch point in the map information database.

4. The navigation apparatus as in claim 3,
   wherein the road information display area for displaying the road information occupies plural sections in the branch point image with an order of precedence that abides by a predetermined rule,
   the control unit assigns to each of the travelable roads from the approaching branch point in the branch point image the order of precedence that abides by the predetermined rule,
   the control unit associates each of the travelable roads from the approaching branch point with each of the road information display areas according to the order of precedence assigned thereto, and
   the control unit displays the road information of each of the travelable roads in the road information display area that is associated to each of the travelable roads.

5. The navigation apparatus as in claim 4,
   wherein the road information display area in the plurality of information pieces has an order of precedence in a circular direction from a predetermined point in the branch point image, and
   the control unit assigns to each of the travelable roads from the approaching branch point in the order of precedence in the circular direction from the predetermined point in the branch point image.

6. The navigation apparatus of claim 1, wherein the road information is image data representing a road type and a road number.

7. The navigation apparatus of claim 1,
   the plurality of information pieces indicating different roads for a same exit from a branch point.

* * * * *